US012810200B2

(12) United States Patent
Pinho

(10) Patent No.: US 12,810,200 B2
(45) Date of Patent: Nov. 24, 2026

(54) GAN-BASED DATA GENERATION FOR CONTINUOUS CENTRALIZED ML TRAINING

(71) Applicant: Dell Products L.P., Round Rock, TX (US)

(72) Inventor: Rômulo Teixeira De Abreu Pinho, Niterói (BR)

(73) Assignee: Dell Products L.P., Round Rock, TX (US)

( * ) Notice: Subject to any disclaimer, the term of this patent is extended or adjusted under 35 U.S.C. 154(b) by 1102 days.

(21) Appl. No.: 17/933,348

(22) Filed: Sep. 19, 2022

(65) Prior Publication Data

US 2024/0095576 A1 Mar. 21, 2024

(51) Int. Cl.

*G06N 3/045* (2023.01)
*G06N 20/00* (2019.01)
*G06V 10/774* (2022.01)

(52) U.S. Cl.

CPC ........... *G06N 20/00* (2019.01); *G06V 10/774* (2022.01)

(58) Field of Classification Search

CPC ...... G06N 20/00; G06N 3/0475; G06N 3/094; G06N 3/098; G06N 3/045; G06V 10/774; G06V 2201/03

See application file for complete search history.

(56) References Cited

U.S. PATENT DOCUMENTS

| | | | | |
|---|---|---|---|---|
| 2022/0222583 | A1* | 7/2022 | Wouhaybi | H04L 67/10 |
| 2023/0088561 | A1* | 3/2023 | Ickin | G06N 3/098 706/12 |
| 2023/0350977 | A1* | 11/2023 | Guha | G06F 18/2148 |

OTHER PUBLICATIONS

"Catastrophic interference", Wikipedia https://en.wikipedia.org/wiki/Catastrophic_interference (accessed on Apr. 10, 2022).

Qiang Fei, Yingsi Jian, Mingyue Wei, Shuyuan Xiao, "Forgetting in Deep Learning", Towards Data Science, Dec. 16, 2020, https://towardsdatascience.com/forgetting-in-deep-learning-4672e8843a7f (accessed on Apr. 10, 2022).

Goodfellow, I., Pouget-Abadie, J., Mirza, M., Xu, B., Warde-Farley, D., Ozair, S., . . . Bengio, Y. (2014). Generative adversarial nets. In Advances in neural information processing systems (pp. 2672-2680).

* cited by examiner

*Primary Examiner* — Sanchita Roy
(74) *Attorney, Agent, or Firm* — Workman Nydegger

(57) ABSTRACT

Machine learning model training using real and/or synthetic data is disclosed. Nodes contribute data to a central machine learning service. The data is used to train corresponding models whose generators, when trained, are configured to generate synthetic data according to a node's distribution. When a node is unavailable or for other reasons, the data contributed by the node for retraining a machine learning model includes at least some synthetic data from an enabled generator.

20 Claims, 6 Drawing Sheets

GAN-BASED DATA GENERATION FOR CONTINUOUS CENTRALIZED ML TRAINING

FIELD OF THE INVENTION

Embodiments of the present invention generally relate to training machine learning models. More particularly, at least some embodiments of the invention relate to systems, hardware, software, computer-readable media, and methods for training machine learning models using synthetic data.

BACKGROUND

Generally, machine learning models are configured to recognize certain types of patterns and generate inferences. In one example, a machine learning model may be trained to recognize certain types of images (e.g., cancer in an Xray image), using an appropriate dataset of labeled (e.g., no cancer, cancer) images. After the machine learning model is trained, the machine learning model can be deployed and new Xray images are provided as input. The output of the trained machine learning model may be a probability or an inference that the Xray being processed includes cancer.

However, machine learning models can lose their generalization capabilities when presented with new data. For example, the model parameters may converge to a configuration in which what was previously learned in forgotten. The situation can be worse if the new data lacks information about some of the patterns that need to be learned.

This problem can be mitigated by retraining the machine learning model using all data (new and old). However, this is impractical because storage is not unlimited. As a result, the process of training machine learning models and of retraining machine learning models is impacted by the fact that data may not be available.

One approach to this problem is to use imputation techniques such as interpolation or probabilistic modeling. However, these techniques may introduce biases in the data and may lead to inadequate data generation if probabilistic assumptions (e.g., Gaussian) are wrong. Further, it is impractical to model and validate a different probability distribution for each node operating an instance of the machine learning model.

BRIEF DESCRIPTION OF THE DRAWINGS

In order to describe the manner in which at least some of the advantages and features of the invention may be obtained, a more particular description of embodiments of the invention will be rendered by reference to specific embodiments thereof which are illustrated in the appended drawings. Understanding that these drawings depict only typical embodiments of the invention and are not therefore to be considered to be limiting of its scope, embodiments of the invention will be described and explained with additional specificity and detail through the use of the accompanying drawings, in which.

DETAILED DESCRIPTION OF SOME EXAMPLE EMBODIMENTS

Figure 1:
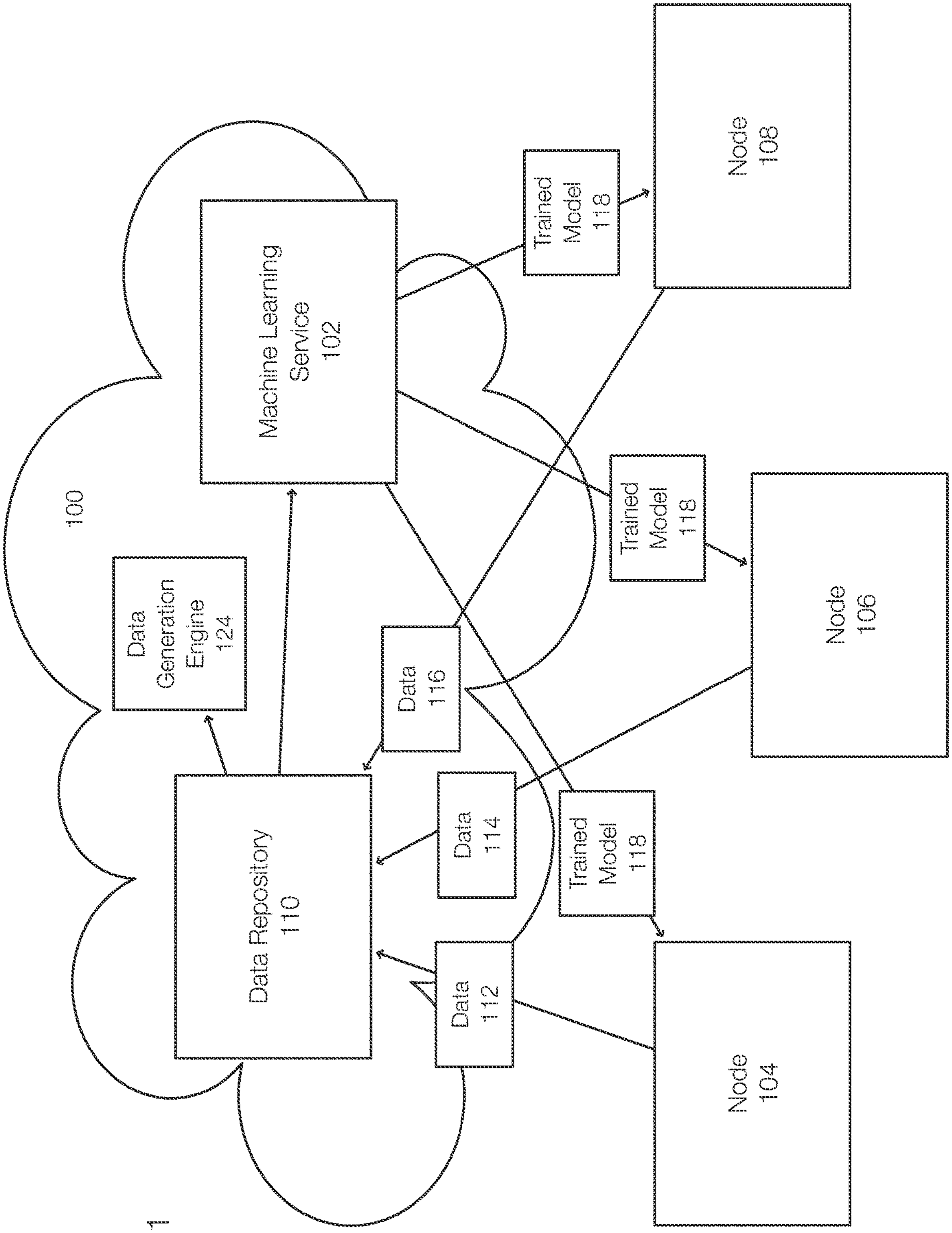
FIG. 1 discloses aspects of a centralized machine learning service configured to train and deploy machine learning models.

Embodiments of the present invention generally relate to machine learning models or artificial intelligence. More particularly, at least some embodiments of the invention relate to systems, hardware, software, computer-readable media, and methods for training machine learning models using synthetic data and/or real or actual data.

Embodiments of the invention relate to centralized model training across edge-core-cloud. In one example, far edge nodes (nodes) send data to a centralized service (e.g., at the near-edge, the core, or the cloud). The centralized service uses the data collected or received from the nodes to train/update a machine learning model. The central service then distributes the trained/updated machine learning model back to the nodes. When deployed, the machine learning models generate inferences using data generated or collected at the nodes or from other sources. Alternatively, when inference latency is not a hard restriction, nodes may send data to the central service for inference. A machine learning model at the central service generates an inference and sends the inference or other output back to the nodes. In either case, the nodes continually send data to the central service for model retraining or other purposes.

However, there are situations where a node may lose its connection to the central service. Thus, the node's data may not be available to the central service. Stated differently, data from one or more nodes may not be received at the central service or may be under-represented in the training data set. In these situations, the lack of sufficient data from these nodes may impact the process of retraining the machine learning model. For example, the retrained model may be skewed towards the data received from nodes that remained connected to the central service. In one scenario, catastrophic forgetting occurs where the machine learning model completely forgets what was previously learned.

Embodiments of the invention provide a framework or mechanism in which data from the disconnected nodes can be replaced with synthetic data as needed at the central service. In one example, the training the central service is augmented with additional machine learning models, such as Generative Adversarial Networks (GANs), which can be trained to generate synthetic data.

In application-as-a-service (AaaS) scenarios where machine learning is involved, users typically have access to the machine learning functionality via communication channels between their devices and the service provider. Users immediately have access to the service once they install the client-side application on their device and subscribe to the service.

Through the communication channels, depending on the deployment characteristics of the machine learning-based service, data collected from the user devices by the client application and/or machine learning model parameters flow back and forth. Important parts of the overall application architecture are the machine learning training and inference pipelines. While inference may take place entirely inside the users' devices, training, to a large extent, depends on the larger computation capabilities available in the cloud, core, or near edge and is an example of centralized machine learning model training.

Embodiments of the invention relate to embodiments of centralized machine learning model training that account for lost connections and/or the absence of data from nodes. In one example, a model (e.g., a GAN) allows a trained model to generate synthetic data that closely resemble samples from a training dataset. More specifically, a GAN may include two models: a generator g and a discriminator D. The generator generates, from some input noise, synthetic data that should resemble samples drawn from a training data set. The discriminator may be a binary classifier that classifies input as real or fake. During training, the generator becomes better at generating data that can fool the discriminator. The discriminator, in turn, becomes better at discerning between true samples drawn from the training data set and synthetic samples generated by the generator. The model converges when the discriminator, on average, is unable to sufficiently differentiate between true and fake or synthetic data. A model such as a GAN implicitly learns the underlying data distribution and randomly samples from that distribution. When data from a node is unavailable, a trained generator can provide synthetic data.

Embodiments of the invention provide a multiple-model approach to generate synthetic data when communication with edge nodes is lost or node data is otherwise unavailable. The synthetic data generated by the models is a substitute for the data that would have been provided by the nodes if the nodes were available. This may prevent the centralized machine learning model training from being skewed due to the missing real data and may prevent catastrophic forgetting.

In one example, a GAN model is initialized for each node that subscribes to the centralized service. The GAN model starts learning the underlying data distribution associated with the node. When the centralized service starts a retraining process, synthetic data is generated for each node as needed. For example, the training data set used for retraining purposes may be examined to determine an amount of data contributed by each of the nodes. If some nodes are insufficiently represented in the training data set, synthetic data generated by corresponding generators may be added to the training data set.

FIG. 1 discloses aspects of centralized machine learning model training. FIG. 1 illustrates a machine learning service 102, which is an example of a centralized service or centralized machine learning model training. The machine learning service 102 operates in an environment 100 (e.g., a near edge, core, or cloud environment). The infrastructure of the environment 100 may include servers or computers with processors, memory, networking hardware, and the like. Generally, the compute capabilities of the environment 100 are superior to the compute capabilities of far edge nodes.

In this example, the nodes 104, 106, and 108 are associated with (e.g., subscribed) to the machine learning service 102. In this example, the nodes 104, 106, and 108 collect or generate, respectively, data 112, 114, and 116 that is transmitted to the environment 100 and stored in a data repository 110. The machine learning service 102 uses data stored in the data repository 110 to train and/or retrain a machine learning model. Once trained/retrained, the machine learning model is distributed back to the nodes. Thus, the machine learning service 102 sends the trained model 118 to the node 104, the node 106, and the node 108.

FIG. 1 also illustrates a data generation engine 124. The data generation engine 124 is an example of a generator that is configured to generate synthetic data, which may also be stored in the data repository. Each of the nodes 104, 106, and 108 may be associated with a different data generation engine 124. If the data generation engine 124 is associated with the node 104, then the data generation engine 124 is configured to generate synthetic data that is similar to the data 112 received by the node 104. More specifically, the data generation engine 124 may include a model configured to learn a data distribution of the node 104 such that synthetic data can be generated from the learned distribution.

If the node 104 loses communication for a period of time (e.g., long enough for the trained model 118 to forget at least a portion of what was previously learned), or if data from the node 104 is not sufficiently represented in the data repository 110, the data generation engine 124 may generate synthetic data that is provided to the data repository 110 and used by the machine learning service 102 to retrain the machine learning model, which may be redeployed as necessary (e.g., to all nodes once lost nodes are reconnected).

In one example, the machine learning is associated with nodes ($N_1 \ldots N_n$). each of the nodes is associated with a corresponding model (e.g., GAN). Thus, $GAN_i$ corresponds to $N_i$. The machine learning service 102 may ensure that each of the subscribed nodes receives the most up-to-date version of a machine learning model. FIG. 1 illustrates that each of the nodes 104, 106, and 108 receives the same trained model 118. However, it is possible that different nodes may have different versions of the machine learning model at different times. When the machine learning model is first deployed to a node, a corresponding GAN is instantiated in the environment 100 in one embodiment.

The machine learning model 118 received by the nodes may generate inference using data collected or generated by the corresponding node. Because the machine learning service 102 requires data for retraining and updating the model, the data 112, 114, and 116 is also transmitted to the data repository 110. The data received at the data repository 110 is stored until retraining is required. Metrics such as drifting, or model prediction quality may be used to trigger retraining.

The data 112, 114, and 116, in addition to being stored in the data repository 110, is provided to corresponding GAN models. More specifically, the model $GAN_i$ consumes data from the node $N_i$ such that the generator and discriminator of the $GAN_i$ are properly trained. Each $GAN_i$ learns the data distribution of the corresponding node $N_i$.

Figure 2:
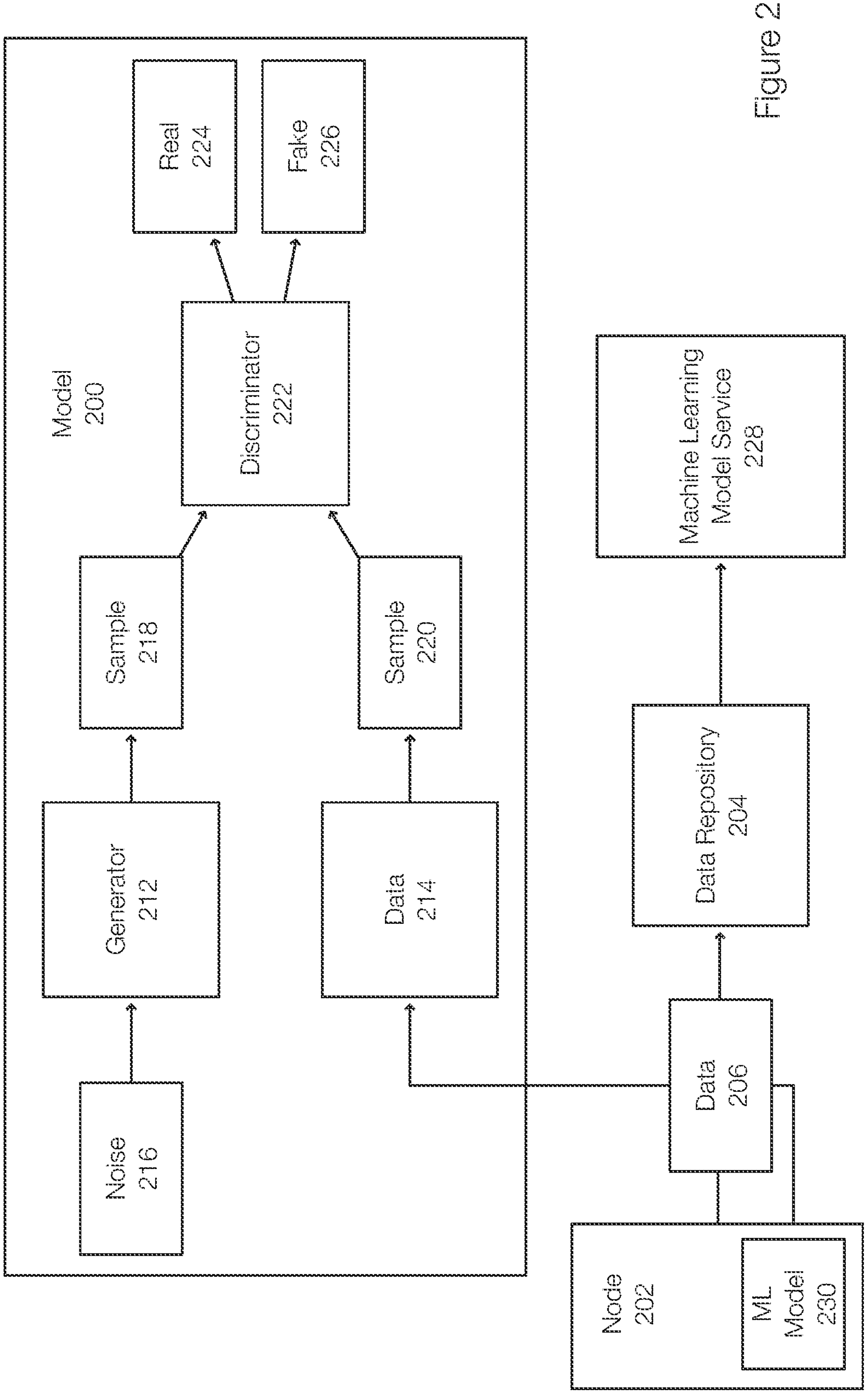
FIG. 2 discloses aspects of training a generator to generate synthetic data after learning a node's data distribution.

FIG. 2 discloses aspects of a training stage that occurs, for example, when a node is connected to a machine learning service. In this example, the node 202 collects or generates data 206. The data 206 may also be consumed by an instance of a machine learning model 230 operating on the node 202. The data 206 is transmitted to a data repository 204. When triggered or for other reasons, the machine learning model service 228 may retrain the machine model using data in the data repository 204. Once retrained the model is redeployed to the node 202.

The data transmitted to or received by the data repository 204 is also consumed by the model 200, which is an example of a GAN. Thus, FIG. 2 illustrates a node 202 ($N_i$) and its corresponding model ($GAN_i$). In this example, only data from the node 202 is used in training the model 200.

The model 200 includes a generator 212 and a discriminator 222. The data 206 used to train the model 200 is represented as data 214. In one example, the data in the data repository 204 is marked such that data for specific nodes can be extracted. Thus, the model 200 may access the data repository 204 to retrieve the data 214.

In the model 200, noise 216 is input to the generator 212 to generate synthetic data (a sample 218). A sample 220 is retrieved from the data 214. These samples 218 and 220, which may be labeled, are input into the discriminator 222 (e.g., at the same or at different times). The discriminator then determines whether the input sample is real 224 or fake 226. Over time, the generator becomes better at generating a sample 218 that more closely resembles the sample 220. Convergence is achieved when the discriminator cannot determine whether an input sample is real or synthetic. Stated differently, convergence is achieved with the synthetic samples appear to be real samples from the perspective of the discriminator 222. When convergence is achieved, the generator 212 may be deployed or enabled. Thus, a trained or enabled generator 212 is an example of the data generation engine 124. FIG. 2 thus illustrates a training stage that includes training the generator 212 and the discriminator 222 of the model 200.

Figure 3:
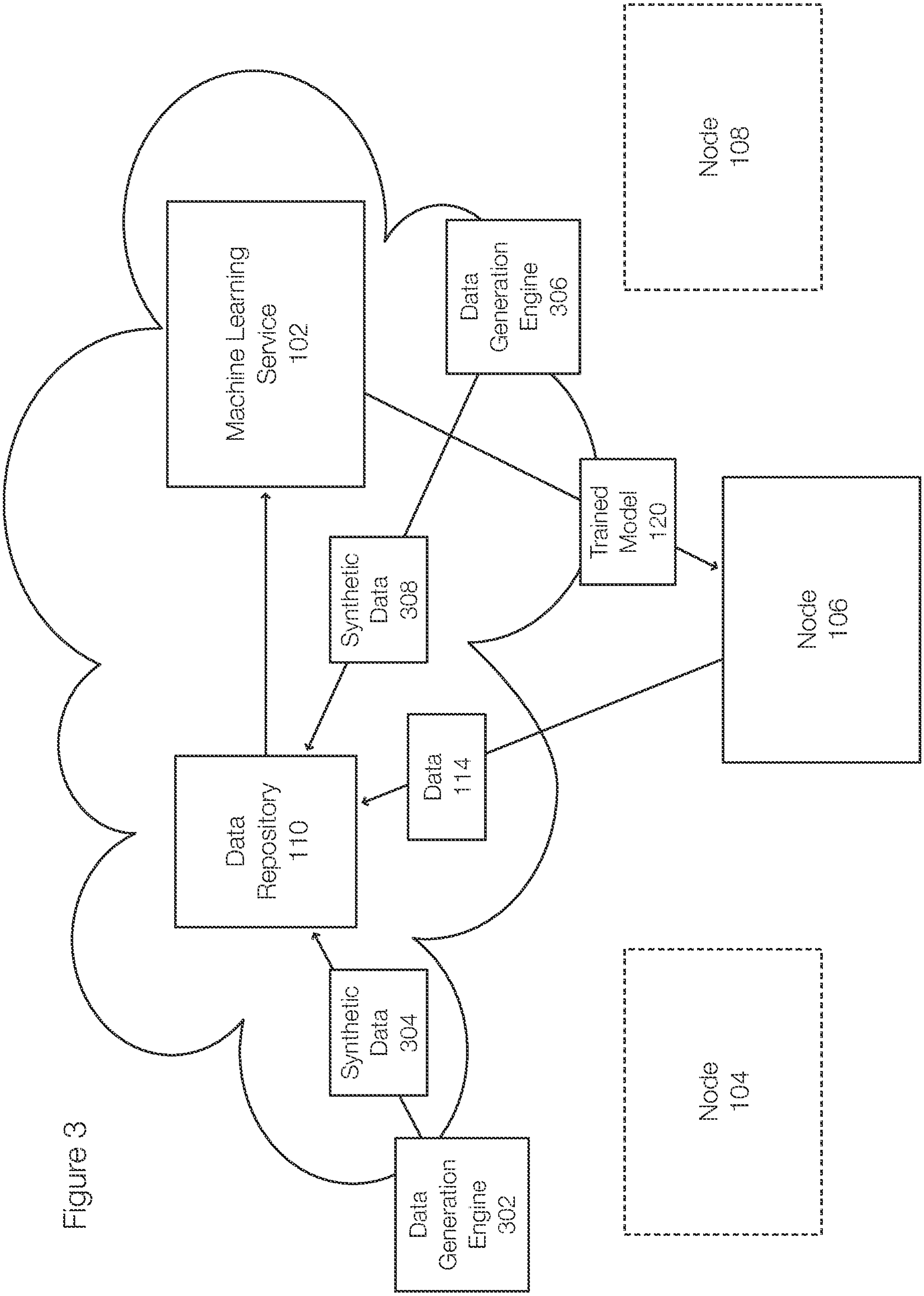
FIG. 3 discloses aspects of training a machine learning model using real and/or synthetic data.

FIG. 3 discloses aspects of a deployment stage. In the deployment stage, the generator is used to generate synthetic data that may be used in retraining a machine learning model. More specifically, it is possible to assume that clients (e.g., the nodes 104, 106, and 108) are subscribed to the same machine learning service 102 and send their data to the machine learning service 102 (or the data repository 110) at roughly the same rate, although connection speeds may impact these rates. However, it may be assumed that each of the nodes 104, 106, and 108 contributes or should contribute about the same amount of data to the retraining process.

As previously stated, a problem may occur if one of the nodes becomes disconnected from the machine learning service 102 or if data from one or more of the nodes is not available or if data from one or more of the nodes is under-represented in the data repository 110. FIG. 3 illustrates that the nodes 104 and 108 are disconnected from the machine learning service 102 or that their data is not available or under-represented or the like. In these situations (embodiments of the invention not limited thereto), data from the nodes 104 and 108 is not being added to the data repository 110 and this may result in a data imbalance that may adversely impact model retraining as previously described.

As previously stated, the clients subscribed to the same machine learning service may collect and send their data to the centralized service manager at roughly the same rate (except for large discrepancies in connection speeds). As a result, it is expected that each client eventually contributes roughly the same amount of data to machine learning model retraining. In other words, severe data imbalance across clients or nodes is somewhat unexpected.

Embodiments of the invention prevent or correct data imbalances using the data generation engine 302 and 306 (or generators 302 and 306). More specifically, the data generation engine 302 generates synthetic data 304 that is added to the data repository 110 when necessary (e.g., data from the node 104 is missing or under-represented). Similarly, the data generation engine 306 generates synthetic data 308, which is added to the data repository 110, when necessary.

The data generation engine 302 is an example of a generator that has been previously trained using data generated by the 104. By way of example, the synthetic data 304 represents or replaces or substitutes for the data that would have been generated by the node 104. Once the node 104 is available, an updated machine learning model may be deployed to the node 104.

When multiple nodes, such as the nodes 104 and 108 are disconnected from the machine learning service 102, the amount of synthetic data 304 and 308 generated may be different. More specifically, the amount of time during which the node 104 is disconnected from the machine learning service 102 may differ from the amount of time that the node 108 is disconnected.

This issue may be addressed using a heuristic. Each $GAN_k$ may include or store a data structure to register (1) whether the GAN model converged with the data it was presented in the last training cycle, where convergence is measured based on whether the $discriminator_k$ has eventually fooled the corresponding $generator_k$, (2) the number of samples received from edge node $N_k$ used to train $GAN_k$; and (3) whether $GAN_k$ is ready to generate samples. Data generation is enabled, as illustrated by the following pseudo code:

```
if time_to_retrain:
data_sizes = [g.num_samples for g in GAN_list]
mean_size = data_sizes.mean( )
std_size = data_sizes.stdev( )
for g in GAN list
g.ready_to_generate = g.converged and g.num_samples
< mean_size - std_size
```

More specifically, the mean and standard deviation of the number of samples used to train the GAN models are determined. For each GAN model, data generation is enabled if the corresponding generator has converged during training and the number of samples used in the generator is less than one standard deviation from the mean number of samples across all of the GAN models.

Assuming that a generator is enabled and if a node is not connected to the machine learning service (or the data is unavailable for other reasons), it can be assumed that each node contributes the mean number of samples. As a result, for a node $N_k$ that is not connected to the machine learning service, the corresponding $GAN_k$ is used to generate as many samples as necessary to increase the data size of the data associated with the node $N_k$ to Size=mean size±α*std size, where α is a random number between zero and one.

In one embodiment, nodes associated with more samples that one standard deviation above the mean may be undersampled until the number of samples reaches Size. This ensures that approximately the same number of samples for all edge nodes is used for training/retraining purposes. Further, for nodes where data generation was enabled, the data may include real and/or synthetic data samples.

Figure 4:
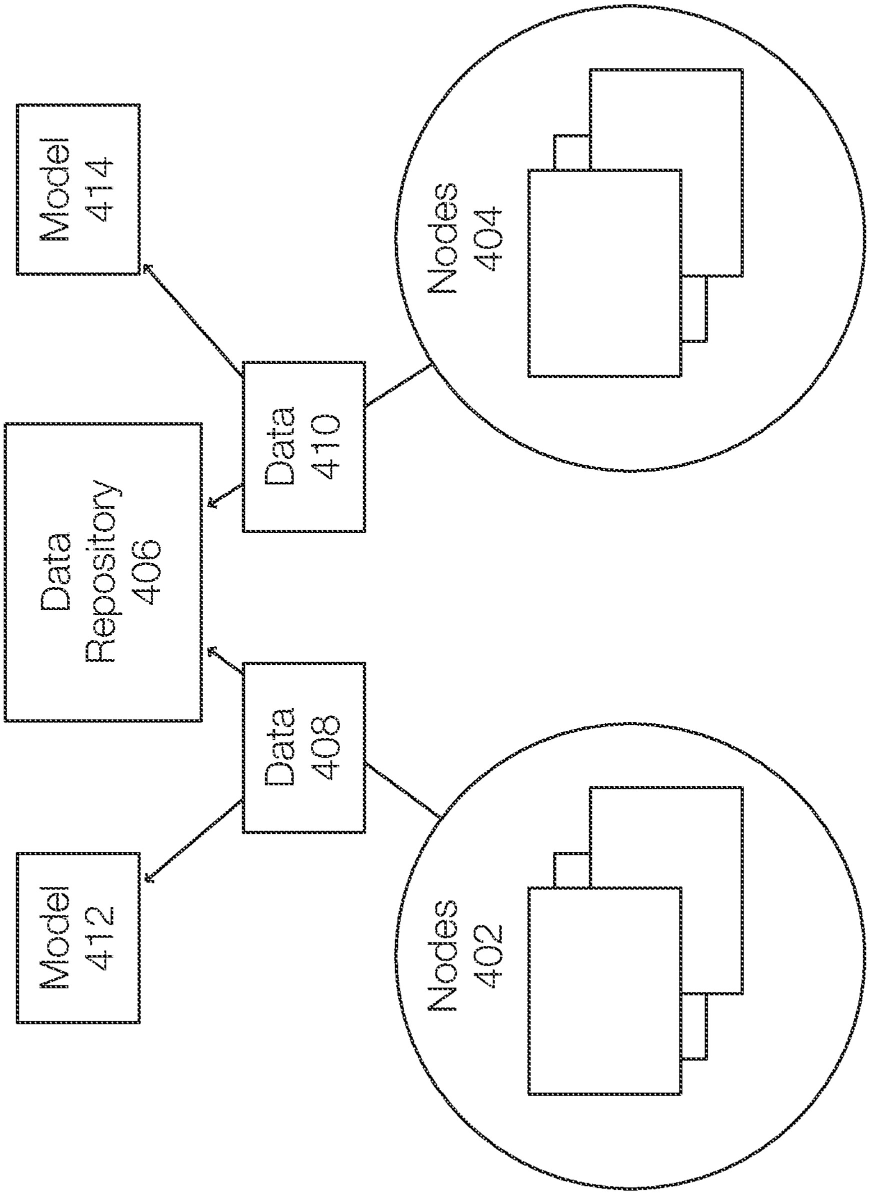
FIG. 4 discloses aspects of training machine learning models using synthetic data representative of multiple nodes or data sources.

In one example, after retraining is completed, all data may be removed from the data repository and the information in the GAN's data structures is reset. However, the trained GANs remain the same and are continuously trained as more data is received from the edge nodes. This allows the GANS to incrementally learn changes that may occur in the data distributions of edge nodes and adapt accordingly for the next model retraining. In this example, each of the edge nodes is associated with a GAN model. FIG. 4 discloses aspects of an aggregated GAN model.

FIG. 4 discloses aspects of associating a GAN model with multiple nodes. FIG. 4 illustrates nodes 402 and nodes 404. The nodes 402 may be grouped or aggregated based on some characteristic or criterion (e.g., region, node characteristic, location, or the like). This allows a model, such as the models 412 and 414, to be trained to generate synthetic data for a grouping or a plurality of nodes. In this example, the data 408 from the nodes 402 is provided to the data repository 406 and used in training the model 412. Similarly, the data 410 is used to train the model 414. In other words, the model 412 corresponds to a grouping of nodes.

A data structure or other data may be maintained such that the groupings are identified and such that data from nodes in a particular grouping is provided to the corresponding model.

Each edge node may be identified in terms of which aggregation it belongs to, so that its data is assigned to the correct GAN model.

Once the generator of the model 412 is enabled to generate synthetic data, the model 412 (or 414) will generate synthetic data as required. More specifically, the model 412 may be used when one or more of the nodes are unavailable or when their data is unavailable. The amount of synthetic data generated by the generator may depend on how much data is needed as previously described. In other words, when the machine learning model is retrained, the generators that have been enabled may generate synthetic data.

In one embodiment, the synthetic data is generated to account for missing data from nodes in a centralized machine learning environment. Embodiments of the framework rely, by way of example, on GAN models that learn data distributions from the nodes while they send data to the central machine learning service. Whenever a node disconnects from the service, the trained generator of the GAN model associated with that node generates random synthetic data for machine learning model training, following the same data distribution learned by the GAN model. This avoids skewness and the catastrophic forgetting effect in which the model may forget what it had learned from that node's available data in the past.

As discussed herein, synthetic data may be generated for nodes that are not available. However, synthetic data may be generated for other reasons. For example, a node may be generating and transmitting data to the machine learning model. Due to connection speeds, that node may have transmitted significantly less than other nodes. An enabled generator may be used to generate synthetic data to make up the difference such that each of the nodes contributes more or less equally to the set of training data.

Figure 5:
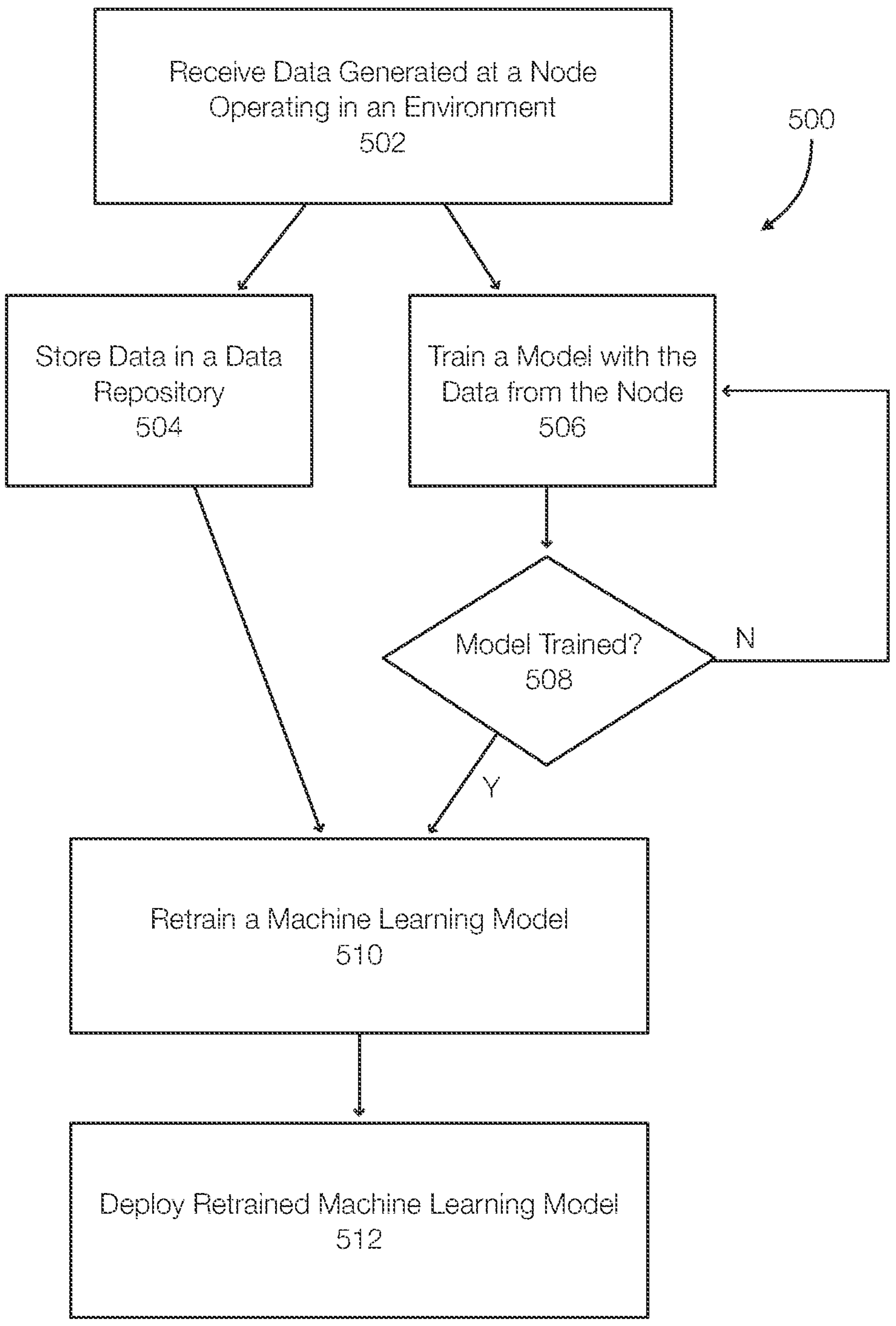
FIG. 5 discloses aspects of training/retraining a machine learning model using synthetic data.

FIG. 5 discloses aspects of training a machine learning model. The method 500 includes receiving 502 data generated at a node operating in an environment. Although FIG. 5 is illustrated from the perspective of a single node, embodiments extend to multiple nodes as previously described. The data received from or transmitted by the node is stored 504 in a data repository. The data is also used to train 506 a model (e.g., a GAN model). The model is trained using data from the node such that, if necessary, the model can generate synthetic data. The model learns the node's data distribution and is able to generate samples that appear to be the same as or similar to data that would be generated by the node. This example also assumes that the data repository stores data from multiple nodes.

Once the model is trained (Y at 508) and if necessary as described herein, synthetic data from model and/or real data from the nodes that is stored in the data repository are used to retrain 510 a machine learning model. The retrained machine learning model (or trained machine learning model if this is the first deployment) is deployed 512 to the node (and to other nodes).

Training 506 a model to generate synthetic data ensures that, when the machine learning model is retrained, the training is not skewed due to missing data from one or more nodes. The synthetic data ensures that all of the nodes contribute more or less equally to the data used to retrain the machine learning model. Stated differently, this allows all nodes to contribute appropriately. In one example, this allows all nodes to contribute about the same amount of data (e.g., withing one standard deviation from the mean). Alternatively, there may be situations where the nodes contribute different amount for different reasons.

Embodiments of the invention, such as the examples disclosed herein, may be beneficial in a variety of respects. For example, and as will be apparent from the present disclosure, one or more embodiments of the invention may provide one or more advantageous and unexpected effects, in any combination, some examples of which are set forth below. It should be noted that such effects are neither intended, nor should be construed, to limit the scope of the claimed invention in any way. It should further be noted that nothing herein should be construed as constituting an essential or indispensable element of any invention or embodiment. Rather, various aspects of the disclosed embodiments may be combined in a variety of ways so as to define yet further embodiments. Such further embodiments are considered as being within the scope of this disclosure. As well, none of the embodiments embraced within the scope of this disclosure should be construed as resolving, or being limited to the resolution of, any particular problem(s). Nor should any such embodiments be construed to implement, or be limited to implementation of, any particular technical effect (s) or solution(s). Finally, it is not required that any embodiment implement any of the advantageous and unexpected effects disclosed herein.

The following is a discussion of aspects of example operating environments for various embodiments of the invention. This discussion is not intended to limit the scope of the invention, or the applicability of the embodiments, in any way.

In general, embodiments of the invention may be implemented in connection with systems, software, and components, that individually and/or collectively implement, and/or cause the implementation of, machine learning operations which may include, but are not limited to, model (e.g., GAN model) training operations, machine learning retraining operations, synthetic data generation operations, or the like or combination thereof. More generally, the scope of the invention embraces any operating environment in which the disclosed concepts may be useful.

New and/or modified data collected and/or generated in connection with some embodiments, may be stored in a data environment that may take the form of a public or private cloud storage environment, an on-premises storage environment, and hybrid storage environments that include public and private elements. Any of these example storage environments, may be partly, or completely, virtualized.

Example cloud computing environments, which may or may not be public, include storage environments that may provide data protection functionality for one or more clients. Another example of a cloud computing environment is one in which processing, data protection, and other, services may be performed on behalf of one or more clients. Some example cloud computing environments in connection with which embodiments of the invention may be employed include, but are not limited to, Microsoft Azure, Amazon AWS, Dell EMC Cloud Storage Services, and Google Cloud. More generally however, the scope of the invention is not limited to employment of any particular type or implementation of cloud computing environment.

In addition to the cloud environment, the operating environment may also include one or more clients that are capable of collecting, modifying, and creating, data. As such, a particular client may employ, or otherwise be associated with, one or more instances of each of one or more applications that perform such operations with respect to data. Such clients may comprise physical machines, containers, or virtual machines (VMs).

Particularly, devices in the operating environment may take the form of software, physical machines, containers, or VMs, or any combination of these, though no particular device implementation or configuration is required for any embodiment. Similarly, data protection system components such as databases, storage servers, storage volumes (LUNs), storage disks, replication services, backup servers, restore servers, backup clients, and restore clients, for example, may likewise take the form of software, physical machines, containers or virtual machines (VM), though no particular component implementation is required for any embodiment.

As used herein, the term 'data' is intended to be broad in scope. Thus, that term embraces, by way of example and not limitation, data segments such as may be produced by data stream segmentation processes, data chunks, data blocks, atomic data, emails, objects of any type, sensor data, or the like.

Example embodiments of the invention are applicable to any system capable of storing and handling various types of objects, in analog, digital, or other form. Although terms such as document, file, segment, block, or object may be used by way of example, the principles of the disclosure are not limited to any particular form of representing and storing data or other information. Rather, such principles are equally applicable to any object capable of representing information.

It is noted that any of the disclosed processes, operations, methods, and/or any portion of any of these, may be performed in response to, as a result of, and/or, based upon, the performance of any preceding process(es), methods, and/or, operations. Correspondingly, performance of one or more processes, for example, may be a predicate or trigger to subsequent performance of one or more additional processes, operations, and/or methods. Thus, for example, the various processes that may make up a method may be linked together or otherwise associated with each other by way of relations such as the examples just noted. Finally, and while it is not required, the individual processes that make up the various example methods disclosed herein are, in some embodiments, performed in the specific sequence recited in those examples. In other embodiments, the individual processes that make up a disclosed method may be performed in a sequence other than the specific sequence recited.

Following are some further example embodiments of the invention. These are presented only by way of example and are not intended to limit the scope of the invention in any way.

Embodiment 1. A method comprising: receiving data from nodes at a machine learning service, wherein a machine learning model operates at each of the nodes, storing the data in a data repository associated with the machine learning service, which is configured to retrain the machine learning model, wherein the machine learning service is centrally located with respect to the nodes and wherein the data repository stores data received from the plurality of nodes, training models associated with the nodes, wherein each of the nodes is associated with a different one of the models and wherein each of the models is trained with data from the associated node, wherein each of the models includes a generator that is configured to generate synthetic data, retraining the machine learning model using the data stored in the data repository and the synthetic data generated by one or more of the generators when necessary, and deploying the retrained machine learning model to each of the nodes.

Embodiment 2. The method of embodiment 1, further comprising retraining the machine learning model with the synthetic data only from generators that are enable.

Embodiment 3. The method of embodiment 1 and/or 2, wherein the generators are enabled when corresponding discriminators in the models cannot distinguish between a real data sample and a synthetic sample.

Embodiment 4. The method of embodiment 1, 2, and/or 3, further comprising determining, for each of the nodes, an amount of synthetic data to be used in retraining the machine learning models.

Embodiment 5. The method of embodiment 1, 2, 3, and/or 4, further comprising contributing an amount of synthetic data to ensure that the amount of training data from each of the nodes is within a standard deviation of a mean amount of training data contributed from each of the nodes.

Embodiment 6. The method of embodiment 1, 2, 3, 4, and/or 5, wherein synthetic data is included to ensure that each of the nodes contributes the amount of training data.

Embodiment 7. The method of embodiment 1, 2, 3, 4, 5, and/or 6, wherein each of the models is configured to learn a distribution of data from a corresponding node.

Embodiment 8. The method of embodiment 1, 2, 3, 4, 5, 6, and/or 7, further comprising deleting the data repository after retraining the machine learning model.

Embodiment 9. A method comprising: receiving data from nodes at a machine learning service, wherein a machine learning model operates each of the nodes, wherein the nodes are grouped into groups, each of the groups including one or more of the nodes, storing the data in a data repository associated with the machine learning service configured to retrain the machine learning model, wherein the machine learning service is centrally located with respect to the nodes and wherein the data repository stores data received from the plurality of nodes, training models associated with the groups, wherein each of the groups is associated with a different one of the models and wherein each of the models is trained with data from the nodes of the associated group, wherein each of the models includes a generator that is configured to generate synthetic data, retraining the machine learning model using the data stored in the data repository and the synthetic data generated by one or more of the generators when necessary, and deploying the retrained machine learning model to each of the nodes.

Embodiment 10. The method of embodiment 9, further comprising retraining the machine learning model with the synthetic data only from generators that are enabled.

Embodiment 11. The method of embodiment 9 and/or 10, wherein the generators are enabled when corresponding discriminators in the models cannot distinguish between a real data sample and a synthetic sample.

Embodiment 12. The method of embodiment 9, 10, and/or 11, further comprising determining, for each of the groups, an amount of synthetic data used in retraining the machine learning models and contributing an amount of synthetic data to ensure that the amount of training data from each of the groups is within a standard deviation of a mean amount of training data used from each of the groups.

Embodiment 13. A method for performing any of the operations, methods, or processes, or any portion of any of these, or any combination thereof disclosed herein.

Embodiment 14. A non-transitory storage medium having stored therein instructions that are executable by one or more hardware processors to perform operations comprising the operations of any one or more of embodiments 1-13.

The embodiments disclosed herein may include the use of a special purpose or general-purpose computer including various computer hardware or software modules, as discussed in greater detail below. A computer may include a processor and computer storage media carrying instructions that, when executed by the processor and/or caused to be executed by the processor, perform any one or more of the methods disclosed herein, or any part(s) of any method disclosed.

As indicated above, embodiments within the scope of the present invention also include computer storage media, which are physical media for carrying or having computer-executable instructions or data structures stored thereon. Such computer storage media may be any available physical media that may be accessed by a general purpose or special purpose computer.

By way of example, and not limitation, such computer storage media may comprise hardware storage such as solid state disk/device (SSD), RAM, ROM, EEPROM, CD-ROM, flash memory, phase-change memory ("PCM"), or other optical disk storage, magnetic disk storage or other magnetic storage devices, or any other hardware storage devices which may be used to store program code in the form of computer-executable instructions or data structures, which may be accessed and executed by a general-purpose or special-purpose computer system to implement the disclosed functionality of the invention. Combinations of the above should also be included within the scope of computer storage media. Such media are also examples of non-transitory storage media, and non-transitory storage media also embraces cloud-based storage systems and structures, although the scope of the invention is not limited to these examples of non-transitory storage media.

Computer-executable instructions comprise, for example, instructions and data which, when executed, cause a general-purpose computer, special purpose computer, or special purpose processing device to perform a certain function or group of functions. As such, some embodiments of the invention may be downloadable to one or more systems or devices, for example, from a website, mesh topology, or other source. As well, the scope of the invention embraces any hardware system or device that comprises an instance of an application that comprises the disclosed executable instructions.

Although the subject matter has been described in language specific to structural features and/or methodological acts, it is to be understood that the subject matter defined in the appended claims is not necessarily limited to the specific features or acts described above. Rather, the specific features and acts disclosed herein are disclosed as example forms of implementing the claims.

As used herein, the term 'module' or 'component' or 'engine' may refer to software objects or routines that execute on the computing system. The different components, modules, engines, and services described herein may be implemented as objects or processes that execute on the computing system, for example, as separate threads. While the system and methods described herein may be implemented in software, implementations in hardware or a combination of software and hardware are also possible and contemplated. In the present disclosure, a 'computing entity' may be any computing system as previously defined herein, or any module or combination of modules running on a computing system.

In at least some instances, a hardware processor is provided that is operable to carry out executable instructions for performing a method or process, such as the methods and processes disclosed herein. The hardware processor may or may not comprise an element of other hardware, such as the computing devices and systems disclosed herein.

In terms of computing environments, embodiments of the invention may be performed in client-server environments, whether network or local environments, or in any other suitable environment. Suitable operating environments for at least some embodiments of the invention include cloud computing environments where one or more of a client, server, or other machine may reside and operate in a cloud environment.

Figure 6:
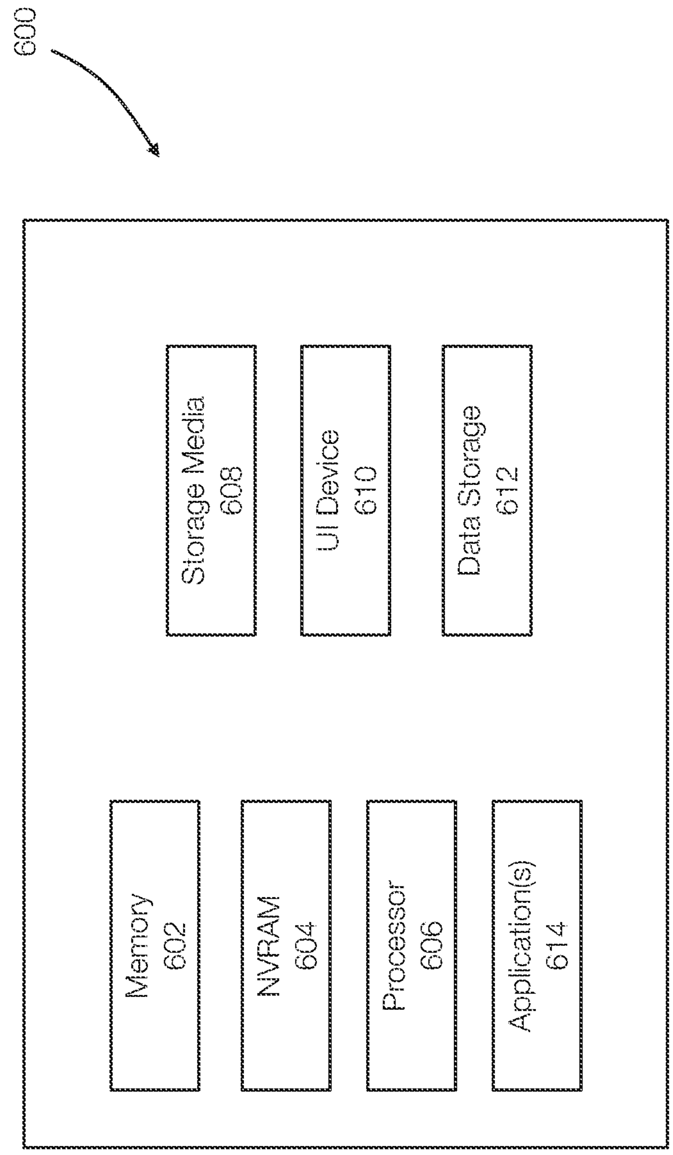
FIG. 6 discloses aspects of a computing device, system, or entity.

With reference briefly now to FIG. 6, any one or more of the entities disclosed, or implied, by Figures, and/or elsewhere herein, may take the form of, or include, or be implemented on, or hosted by, a physical computing device, one example of which is denoted at 600. As well, where any of the aforementioned elements comprise or consist of a virtual machine (VM), that VM may constitute a virtualization of any combination of the physical components disclosed in FIG. 6.

In the example of FIG. 6, the physical computing device 600 includes a memory 602 which may include one, some, or all, of random-access memory (RAM), non-volatile memory (NVM) 604 such as NVRAM for example, read-only memory (ROM), and persistent memory, one or more hardware processors 606, non-transitory storage media 608, UI device 610, and data storage 612. One or more of the memory components 602 of the physical computing device 600 may take the form of solid-state device (SSD) storage. As well, one or more applications 614, which may include machine learning models, may be provided that comprise instructions executable by one or more hardware processors 606 to perform any of the operations, or portions thereof, disclosed herein.

Such executable instructions may take various forms including, for example, instructions executable to perform any method or portion thereof disclosed herein, and/or executable by/at any of a storage site, whether on-premises at an enterprise, or a cloud computing site, client, datacenter, data protection site including a cloud storage site, or backup server, to perform any of the functions disclosed herein. As well, such instructions may be executable to perform any of the other operations and methods, and any portions thereof, disclosed herein.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. A method comprising:

receiving data from nodes at a machine learning service, wherein a same machine learning model operates at each of the nodes;

storing the data in a data repository associated with the machine learning service, wherein the machine learning service is configured to retrain the machine learning model, wherein the machine learning service is centrally located with respect to the nodes and wherein the data repository stores data received from the plurality of nodes;

training models associated with the nodes, wherein each of the nodes is associated with a different version of the machine learning model and wherein each of the training models is trained with data from the associated node, wherein each of the training models includes a generator that is configured to generate synthetic data, wherein each of the training models is configured to learn a data distribution of the associated node based on the data from the associated node and the generator is configured to generate the synthetic data according to the learned data distribution of the associated node;

determining that an amount of data from one or more of the nodes is unavailable or under-represented relative to a mean amount of data contributed from other nodes;

retraining the machine learning model at the machine learning service, by executing, at the machine learning service, a machine learning training process using the data stored in the data repository and the synthetic data generated by one or more of the generators as training inputs in response to the determining that the amount of data from one or more of the nodes is unavailable or under-represented relative to a mean amount of data contributed from other nodes, wherein the synthetic data is generated to replace missing or under-represented data from the one or more nodes to balance contributions of the nodes during retraining; and deploying the retrained machine learning model to each of the nodes.

2. The method of claim 1, further comprising retraining the machine learning model with the synthetic data only from generators that are enabled.

3. The method of claim 2, wherein the generators are enabled when corresponding discriminators in the models cannot distinguish between a real data sample and a synthetic sample.

4. The method of claim 1, further comprising determining, for each of the nodes, an amount of synthetic data to be used in retraining the machine learning models.

5. The method of claim 4, further comprising contributing an amount of synthetic data to ensure that the amount of training data from each of the nodes is within a standard deviation of a mean amount of training data contributed from each of the nodes.

6. The method of claim 5, wherein synthetic data is included to ensure that each of the nodes contributes the amount of training data.

7. The method of claim 1, wherein each of the models is configured to learn a distribution of data from a corresponding node.

8. The method of claim 1, further comprising deleting the data repository after retraining the machine learning model.

9. A non-transitory storage medium having stored therein instructions that are executable by one or more hardware processors to perform operations comprising:

receiving data from nodes at a machine learning service, wherein a same machine learning model operates at each of the nodes;

storing the data in a data repository associated with the machine learning service, wherein the machine learning service is configured to retrain the machine learning model, wherein the machine learning service is centrally located with respect to the nodes and wherein the data repository stores data received from the plurality of nodes;

training models associated with the nodes, wherein each of the nodes is associated with a different version of the machine learning model and wherein each of the training models is trained with data from the associated node, wherein each of the training models includes a generator that is configured to generate synthetic data, wherein each of the training models is configured to learn a data distribution of the associated node based on the data from the associated node and the generator is configured to generate the synthetic data according to the learned data distribution of the associated node;

retraining the machine learning model at the machine learning service, by executing, at the machine learning service, a machine learning training process using the data stored in the data repository and the synthetic data generated by one or more of the generators as training inputs in response to determining that an amount of data from one or more of the nodes is unavailable or under-represented relative to a mean amount of data contributed from other nodes, wherein the synthetic data is generated to replace missing or under-represented data from the one or more nodes to balance contributions of the nodes during retraining; and deploying the retrained machine learning model to each of the nodes.

10. The non-transitory storage medium of claim 9, further comprising retraining the machine learning model with the synthetic data only from generators that are enable.

11. The non-transitory storage medium of claim 10, wherein the generators are enabled when corresponding discriminators in the models cannot distinguish between a real data sample and a synthetic sample.

12. The non-transitory storage medium of claim 9, further comprising determining, for each of the nodes, an amount of synthetic data to be used in retraining the machine learning models.

13. The non-transitory storage medium of claim 12, further comprising contributing an amount of synthetic data to ensure that the amount of training data from each of the nodes is within a standard deviation of a mean amount of training data contributed from each of the nodes.

14. The non-transitory storage medium of claim 13, wherein synthetic data is included to ensure that each of the nodes contributes the amount of training data.

15. The non-transitory storage medium of claim 9, wherein each of the models is configured to learn a distribution of data from a corresponding node.

16. The non-transitory storage medium of claim 9, further comprising deleting the data repository after retraining the machine learning model.

17. A method comprising:

receiving data from nodes at a machine learning service, wherein a machine learning model operates at each of the nodes, wherein the nodes are grouped into groups, each of the groups including one or more of the nodes;

storing the data in a data repository associated with the machine learning service, wherein the machine learning service is configured to retrain the machine learning model, wherein the machine learning service is centrally located with respect to the nodes and wherein the data repository stores data received from the plurality of nodes;

training models associated with the groups, wherein each of the groups is associated with a model at the machine learning service and wherein each of the training models is trained with data from the nodes of the associated group, wherein each of the training models includes a generator that is configured to generate synthetic data, wherein each of the training models is configured to learn a data distribution of the associated group based on the data from the nodes of the associated group and the generator is configured to generate the synthetic data according to the learned data distribution of the associated group;

determining that an amount of data from one or more groups is unavailable or under-represented relative to a mean amount of data contributed by other groups;

retraining the machine learning model at the machine learning service, by executing, at the machine learning service, a machine learning training process using the data stored in the data repository and the synthetic data generated by one or more of the generators as training inputs in response to the determining that the amount of data from one or more groups is unavailable or under-represented relative to other groups, wherein the synthetic data is generated to replace missing or under-represented data from the one or more groups to balance contributions of the groups during retraining; and deploying the retrained machine learning model to each of the nodes.

18. The method of claim 17, further comprising retraining the machine learning model with the synthetic data only from generators that are enabled.

19. The method of claim 18, wherein the generators are enabled when corresponding discriminators in the models cannot distinguish between a real data sample and a synthetic sample.

20. The method of claim 17, further comprising determining, for each of the groups, an amount of synthetic data used in retraining the machine learning models and contributing an amount of synthetic data to ensure that the amount of training data from each of the groups is within a standard deviation of a mean amount of training data used from each of the groups.

* * * * *